US010381638B2

United States Patent
Sheem

(10) Patent No.: US 10,381,638 B2
(45) Date of Patent: Aug. 13, 2019

(54) NEGATIVE ACTIVE MATERIAL FOR RECHARGEABLE LITHIUM BATTERY, AND RECHARGEABLE LITHIUM BATTERY INCLUDING THE SAME

(71) Applicant: SAMSUNG SDI CO., LTD., Yongin-si, Gyeonggi-do (KR)

(72) Inventor: Kyeu-Yoon Sheem, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 268 days.

(21) Appl. No.: 15/245,032

(22) Filed: Aug. 23, 2016

(65) Prior Publication Data

US 2017/0062803 A1    Mar. 2, 2017

(30) Foreign Application Priority Data

Aug. 27, 2015    (KR) .................. 10-2015-0121122

(51) Int. Cl.
| | |
|---|---|
| *H01M 4/04* | (2006.01) |
| *H01M 4/133* | (2010.01) |
| *H01M 4/36* | (2006.01) |
| *H01M 4/583* | (2010.01) |
| *H01M 10/0525* | (2010.01) |
| *H01M 4/02* | (2006.01) |

(52) U.S. Cl.
CPC ......... *H01M 4/133* (2013.01); *H01M 4/0428* (2013.01); *H01M 4/366* (2013.01); *H01M 4/583* (2013.01); *H01M 10/0525* (2013.01); *H01M 2004/027* (2013.01); *H01M 2220/20* (2013.01); *H01M 2220/30* (2013.01)

(58) Field of Classification Search
None
See application file for complete search history.

(56) References Cited

U.S. PATENT DOCUMENTS

| 6,150,055 A | 11/2000 | Kato et al. |
| 6,482,547 B1 * | 11/2002 | Yoon ................. H01M 4/133 |
| | | 429/218.1 |
| 7,799,460 B2 | 9/2010 | Choi et al. |
| 2002/0015888 A1 | 2/2002 | Omaru et al. |

(Continued)

FOREIGN PATENT DOCUMENTS

| JP | 2001-332263 A | 11/2001 |
| JP | 3794553 B2 | 4/2006 |

(Continued)

OTHER PUBLICATIONS

Jiang. "Studying disorder in graphite-based systems by Raman spectroscopy". Aug. 20, 2015. Carbon. 90. 53-62 (Available online Mar. 28, 2015) (Year: 2015).*

(Continued)

*Primary Examiner* — Haroon S. Sheikh
(74) *Attorney, Agent, or Firm* — Knobbe, Martens, Olson & Bear, LLP

(57) ABSTRACT

A negative active material for a rechargeable lithium battery includes a carbon component having a ratio ($I_{1360}/I_{1620}$) of peak intensity ($I_{1360}$) at 1360 cm$^{-1}$ relative to peak intensity ($I_{1620}$) at 1620 cm$^{-1}$ ranging from about 1 to about 4.5 measured by Raman spectroscopy.

14 Claims, 1 Drawing Sheet

(56) References Cited

U.S. PATENT DOCUMENTS

| | | | |
|---|---|---|---|
| 2005/0058904 A1* | 3/2005 | Kano | H01M 4/364 429/231.4 |
| 2009/0202917 A1 | 8/2009 | Sotowa et al. | |
| 2014/0080002 A1 | 3/2014 | Han et al. | |
| 2015/0270535 A1* | 9/2015 | Takeuchi | H01M 4/366 429/306 |

FOREIGN PATENT DOCUMENTS

| | | |
|---|---|---|
| JP | 2009-211818 A | 9/2009 |
| KR | 10-1999-0018715 A | 3/1999 |
| KR | 10-2000-0032795 A | 6/2000 |
| KR | 10-2001-0054903 A | 7/2001 |
| KR | 10-2002-0010843 A | 2/2002 |
| KR | 10-2004-0057417 A | 7/2004 |
| KR | 10-2005-0099697 A | 10/2005 |
| KR | 10-2008-0080282 A | 9/2008 |
| KR | 10-2012-0130710 A | 12/2012 |

OTHER PUBLICATIONS

Pimenta. "A Raman spectroscopy signature for characterizing defective single-layer graphene: Defect-induced I(D)/I(D0) intensity ratio by theoretical analysis". Jan. 11, 2007. Physical Chemistry Chemical Physics. 9. 1276-1291. (Year: 2007).*

Asbury Carbons. "An introduction to synthetic graphite." (Year: 2006).*

Feret ("Determination of the crystallinity of calcined and graphitic cokes by X-ray diffraction") (Year: 1998).*

Eckmann et al., "Probing the Nature of Defects in Graphene by Raman Spectroscopy," dx.doi.org/10.1021/nl300901a | *Nano Lett*, 2012, 12, 3925-3930.

* cited by examiner

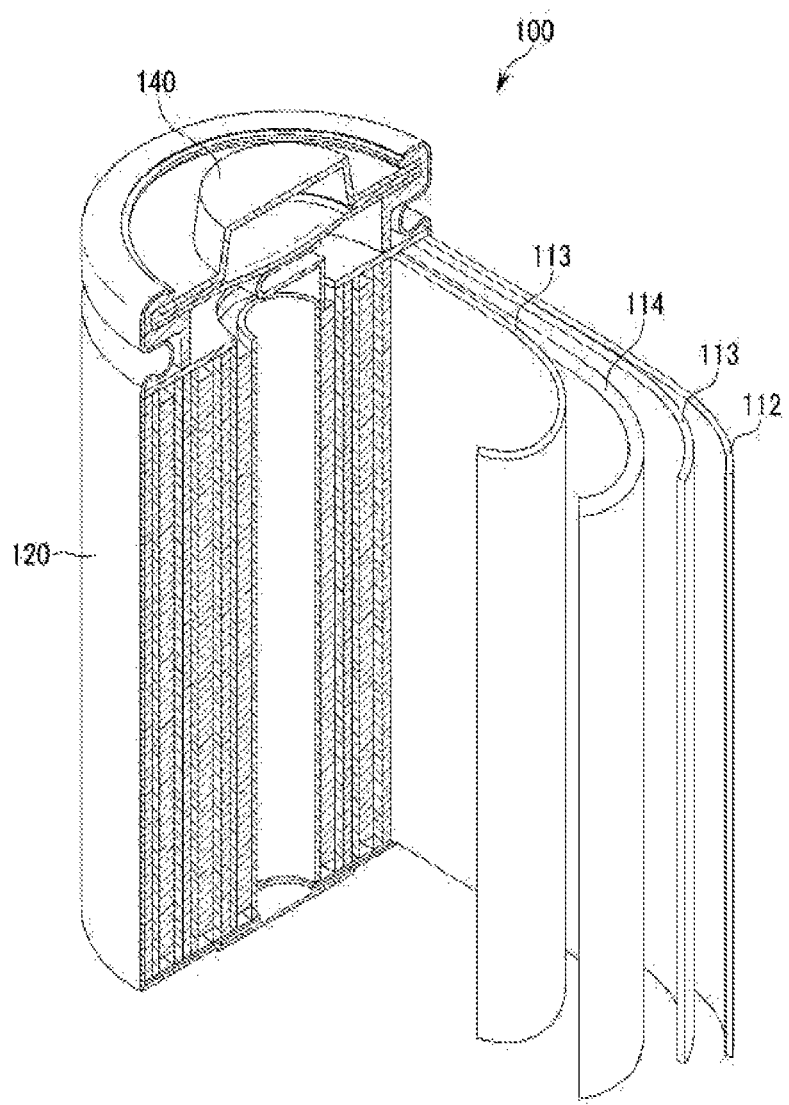

NEGATIVE ACTIVE MATERIAL FOR RECHARGEABLE LITHIUM BATTERY, AND RECHARGEABLE LITHIUM BATTERY INCLUDING THE SAME

RELATED APPLICATIONS

Any and all priority claims identified in the Application Data Sheet, or any correction thereto, are hereby incorporated by reference under 37 CFR 1.57.

For Example, this application claims priority to and the benefit of Korean Patent Application No. 10-2015-0121122 filed in the Korean Intellectual Property Office on Aug. 27, 2015, the disclosure of which is incorporated herein by reference in its entirety.

BACKGROUND

Field

This disclosure relates to a negative active material for a rechargeable lithium battery and a rechargeable lithium battery including the same are disclosed.

Description of the Related Technology

Recently, a rechargeable lithium battery highlighted as a power source for a small portable electronic device has been widely applied to an electric vehicle, electric power storage, and the like. In addition, since the rechargeable lithium battery is required to meet certain performance expectations for a diverse variety of applied apparatuses, there is an increased need for a customized electrode active material to be developed.

As for a negative active material for the rechargeable lithium battery, a carbon-based material has been mainly used, and the carbon-based material is generally classified into crystalline graphite and amorphous carbon. The crystalline graphite is expected to be still used as a power source for small portable electronic devices, and the amorphous carbon is used as a negative active material for a rechargeable lithium battery as a power source for a hybrid vehicle (HEV) requiring high power characteristics.

Recently, an attempt to develop a composite negative active material by using the crystalline graphite and amorphous carbon has been made. The development of the composite negative active material is to simultaneously secure capacity and output characteristics by mixing the crystalline graphite and the amorphous carbon, but the desired result is not accomplished due to interface resistance of the crystalline graphite and the amorphous carbon and the like.

SUMMARY

One embodiment provides a negative active material for a rechargeable lithium battery having high power characteristics by improving the degree of amalgamation at the interface of a crystalline-based carbon core and an amorphous carbon coating layer and thus, decreasing the transport resistance of lithium ions.

Some embodiments provide a negative electrode including the negative active material.

Some embodiments provide a rechargeable lithium battery including the negative electrode.

Some embodiments provide a negative active material for a rechargeable lithium battery including a carbon component having a ratio ($I_{1360}/I_{1620}$) of a peak intensity $I_{1360}$ at 1360 cm$^{-1}$ relative to a peak intensity $I_{1620}$ at 1620 cm$^{-1}$ ranging from about 1 to about 4.5 measured by Raman spectroscopy.

In some embodiments the carbon component may have a ratio ($I_{1360}/I_{1620}$) of a peak intensity $I_{1360}$ at 1360 cm$^{-1}$ relative to a peak intensity $I_{1620}$ at 1620 cm$^{-1}$ ranging from about 1.1 to about 4.4 in Raman spectroscopy.

In some embodiments the carbon component may have a ratio ($I_{1360}/I_{1620}$) of a peak intensity $I_{1360}$ at 1360 cm$^{-1}$ relative to a peak intensity $I_{1620}$ at 1620 cm$^{-1}$ ranging from about 1.2 to about 4.3 in Raman spectroscopy.

In some embodiments the carbon component may have a ratio ($I_{1620}/I_{1580}$) of a peak intensity $I_{1620}$ at 1620 cm$^{-1}$ relative to a peak intensity $I_{1580}$ at 1580 cm$^{-1}$ ranging from about 0.01 to about 0.5 in Raman spectroscopy.

In some embodiments the carbon component may be a composite carbon material including carbon including crystalline carbon and surface-damaged carbon having defects on the surface of the core carbon and including amorphous carbon.

In some embodiments the ratio ($I_{1620}/I_{1580}$) of a peak intensity $I_{1620}$ at 1620 cm$^{-1}$ relative to a peak intensity $I_{1580}$ at 1580 cm$^{-1}$ may have a substantially predetermined value in Raman spectroscopy of the composite carbon material regardless of an amount of the surface-damaged carbon.

In some embodiments, the core carbon may have an average particle diameter (D50) of about 3 μm to about 50 μm.

In some embodiments, the surface-damaged carbon may be present in an amount of about 0.5 wt % to about 8.5 wt % based on the total weight of the composite carbon material.

In some embodiments, the core carbon may include natural graphite, artificial graphite, or a combination thereof.

In some embodiments, the surface-damaged carbon may include soft carbon, hard carbon or a combination thereof.

In some embodiments, the soft carbon may be obtained from coal pitch, petroleum pitch, polyvinylchloride, mesophase pitch, tar, low molecular weight heavy oil, or a combination thereof.

In some embodiments, the hard carbon may be obtained from a polyvinyl alcohol resin, a furfuryl alcohol resin, Triton, citric acid, stearic acid, sucrose, polyvinylidene fluoride, carboxymethyl cellulose, hydroxypropyl cellulose, regenerated cellulose, polyvinylpyrrolidone, polyethylene, polypropylene, an ethylene-propylene-diene monomer (EPDM), polyacrylic acid, sodium polyacrylate, polyacrylonitrile, glucose, gelatin, a saccharide, a phenolic resin, a naphthalene resin, a polyamide resin, a furan resin, a polyimide resin, a cellulose resin, a styrene resin, an epoxy resin and vinyl chloride resin, and a combination thereof.

Some embodiments provide a negative electrode for a rechargeable lithium battery including the negative active material is provided.

Some embodiments provide a rechargeable lithium battery including the negative electrode, a positive electrode, and an electrolyte solution is provided.

Some embodiments provide a negative electrode for a rechargeable lithium battery wherein the negative active material comprises a carbon component having a ratio ($I_{1360}/I_{1620}$) of a peak intensity ($I_{1360}$) at 1360 cm$^{-1}$ relative to a peak intensity ($I_{1620}$) at 1620 cm$^{-1}$ ranging from about 1 to about 4.5 measured by Raman spectroscopy.

Some embodiments provide a negative electrode for a rechargeable lithium battery wherein the negative active material comprises a carbon component having a ratio ($I_{1360}/I_{1620}$) of a peak intensity ($I_{1360}$) at 1360 cm$^{-1}$ relative to a peak intensity ($I_{1620}$) at 1620 cm$^{-1}$ ranging from about 1.1 to about 4.4 in Raman spectroscopy.

Some embodiments provide a negative electrode for a rechargeable lithium battery wherein the negative active material comprises a carbon component having a ratio ($I_{1360}/I_{1620}$) of a peak intensity ($I_{1360}$) at 1360 cm$^{-1}$ relative to a peak intensity ($I_{1620}$) at 1620 cm$^{-1}$ ranging from about 1.2 to about 4.3 in Raman spectroscopy.

Some embodiments provide a negative electrode for a rechargeable lithium battery wherein the negative active material comprises a carbon component having a ratio ($I_{1620}/I_{1580}$) of a peak intensity ($I_{1620}$) at 1620 cm$^{-1}$ relative to a peak intensity ($I_{1580}$) at 1580 cm$^{-1}$ ranging from about 0.01 to about 0.5 in Raman spectroscopy.

In some embodiments, the rechargeable lithium battery may secure high power characteristics by controlling the surface characteristics of the carbon component of a negative active material so that a ratio ($I_{1360}/I_{1620}$) of a peak intensity ($I_{1360}$) at 1360 cm$^{-1}$ relative to a peak intensity ($I_{1620}$) at 1620 cm$^{-1}$ may satisfy a predetermined range in Raman spectroscopy, and thus lithium may be smoothly intercalated and deintercalated.

BRIEF DESCRIPTION OF THE DRAWINGS

FIG. 1 is a schematic view showing a rechargeable lithium battery according to one embodiment.

DETAILED DESCRIPTION

Hereinafter, embodiments are described in detail. However, these embodiments are exemplary, and this disclosure is not limited thereto.

A negative active material for a rechargeable lithium battery according to one embodiment includes a carbon component having a ratio ($I_{1360}/I_{1620}$, D/D' or $I_D/I_{D'}$) of a peak intensity $I_{1360}$ at 1360 cm$^{-1}$ relative to a peak intensity $I_{1620}$ at 1620 cm$^{-1}$ ranging from about 1 to about 4.5 measured by Raman spectroscopy.

The carbon component may be for example a composite carbon material consisting of carbon core containing crystalline carbon and surface carbon containing amorphous carbon. The surface carbon may have a surface-damaged structure having a defect and is hence called surface-damaged carbon.

As used herein, the peak intensity ($I_{1360}$) at 1360 cm$^{-1}$, peak intensity ($I_{1580}$) at 1580 cm$^{-1}$, and the intensity ($I_{1620}$) at 1620 cm$^{-1}$ in the Raman spectroscopy are respectively represented by as $I_D$ (or D), $I_G$ (or G), and $I_{D'}$(or D').

In some embodiments, when the ratio ($I_{1360}/I_{1620}$, that is, $I_D/I_{D'}$) of the peak intensity ($I_{1360}$) at 1360 cm$^{-1}$ relative to the intensity ($I_{1620}$ at 1620 cm$^{-1}$ is within the range in the Raman spectroscopy, the carbon component may be held to have a relatively small load on the surface. Accordingly, the amorphous carbon in the coating layer of the carbon component may be prevented from degradation.

In some embodiments, the ratio a ($I_{1360}/I_{1620}$, that is, $I_D/I_{D'}$ or D/D') of the peak intensity ($I_{1360}$) at 1360 cm$^{-1}$ relative to the intensity ($I_{1620}$) at 1620 cm$^{-1}$ in the Raman spectroscopy of the carbon component may be for example in a range of about 1.1 to about 4.4. In some embodiments, the ratio ($I_{1360}/I_{1620}$, that is, $I_D/I_{D'}$ or D/D') of the peak intensity ($I_{1360}$) at 1360 cm$^{-1}$ relative to the intensity ($I_{1620}$) at 1620 cm$^{-1}$ in the Raman spectroscopy of the carbon component may be for example in a range of about 1.2 to about 4.3. In some embodiments, the ratio a ($I_{1360}/I_{1620}$, that is, $I_D/I_{D'}$ or D/D') of the peak intensity ($I_{1360}$) at 1360 cm$^{-1}$ relative to the intensity ($I_{1620}$) at 1620 cm$^{-1}$ in the Raman spectroscopy of the carbon component may be for example in a range of about 1.5 to about 4 but is not limited thereto.

In some embodiments, the carbon component of a negative active material has a $I_D/I_{D'}$ within a range of about 1 to about 4.5 in the Raman spectroscopy and herein, has surface crystallinity close to graphite but does not become graphite, and accordingly, large sized graphene forms fault like shapes. In some embodiments large amount of lithium ions may go in and out of the valley-shaped cracks along the fault like shape.

In some embodiments, the carbon component for a negative active material having a ratio between $I_D$ and $I_{D'}$ within the range of about 1 to about 4.5 shows relatively small interface resistance.

In some embodiments, the composite carbon material may have a bi-component structure including a carbon core wherein it includes crystalline carbon in a core particle and surface carbon on the surface of the core particle including amorphous carbon and excellent amalgamation between the crystalline carbon and amorphous carbon is accomplished, and lithium ions may be substantially transported as if there is no interface between the core carbon and surface carbon. In other words, the composite carbon particle shows characteristics like that of pseudo-crystallized carbon.

Since the aforementioned, the surface carbon has a defect and thus is called surface-damaged carbon. In some embodiments, the surface-damaged carbon may be used in a range of about 0.5 wt % to about 8.5 wt % based on the total weight of the composite carbon material.

The Raman peak of the composite carbon material according to some embodiments is illustrated.

In some embodiments, the composite carbon material may have a peak intensity ratio ($I_{1620}/I_{1580}$, that is, $I_D'/I_G$) of peak intensity ($I_{1620}$) at 1620 cm$^{-1}$ relative to peak intensity ($I_{1580}$) at 1580 cm$^{-1}$ in a range of about 0.01 to about 0.5. In some embodiments, the composite carbon material may have a peak intensity ratio ($I_{1620}/I_{1580}$, that is, $I_D'/I_G$) of peak intensity ($I_{1620}$) at 1620 cm$^{-1}$ relative to peak intensity ($I_{1580}$) at 1580 cm$^{-1}$ in a range of about 0.01 to about 0.2. In some embodiments, the composite carbon material may have a peak intensity ratio a ($I_{1620}/I_{1580}$, that is, $I_D'/I_G$) of peak intensity ($I_{1620}$) at 1620 cm$^{-1}$ relative to peak intensity ($I_{1580}$) at 1580 cm$^{-1}$ in a range of about 0.05 to about 0.13 in the Raman spectroscopy. In some embodiments, the peak intensity ratio ($I_{1620}/I_{1580}$, that is, $I_D'/I_G$) of peak intensity ($I_{1620}$) at 1620 cm$^{-1}$ relative to peak intensity ($I_{1580}$) at 1580 cm$^{-1}$ of the composite carbon material in the Raman spectroscopy may be substantially constant regardless of the content of the surface-damaged carbon and may be within an error range of ±0.001. In other words, the composite carbon material may have a constant $I_D'/I_G$ regardless of the content of surface-damaged carbon due to a small structural defect at the interface between the crystalline carbon core and the amorphous carbon surface layer.

In some embodiments, the average particle diameter (D50) of the core carbon may be, for example about 3 μm to about 50 μm. The average particle diameter (D50) indicates a particle diameter corresponding to 50 volume % of a cumulative volume in a particle distribution.

In some embodiments, the crystalline carbon included in the core carbon may include, for example, natural graphite, artificial graphite or a combination thereof, and the amorphous carbon included in the coating layer may include, for example, soft carbon, hard carbon, or a combination thereof.

For example, the soft carbon may be obtained from coal pitch, petroleum pitch, polyvinylchloride, mesophase pitch, tar, low molecular weight heavy oil, or a combination thereof, the hard carbon may be obtained from a polyvinyl alcohol resin, a furfuryl alcohol resin, triton, citric acid, stearic acid, sucrose, polyvinylidene fluoride, carboxylmethyl cellulose, hydroxypropyl cellulose, regenerated cellulose, polyvinylpyrrolidone, polyethylene, polypropylene, an ethylene-propylene-diene monomer (EPDM), polyacrylic acid, sodium polyacrylate, polyacrylonitrile, glucose, gelatin, a saccharide, a phenolic resin, a naphthalene resin, a polyamide resin, a furan resin, a polyimide resin, a cellulose resin, a styrene resin, an epoxy resin and vinyl chloride resin, or a combination thereof. However these are examples, but are not limited thereto.

Hereinafter, according some embodiments, a rechargeable lithium battery including the negative active material is provided. The rechargeable lithium battery is described referring to FIG. 1. FIG. 1 shows an example of a rechargeable lithium battery, but the present invention is not limited thereto, and may have any shape such as cylinder, prism, coin-type, pouch-type.

FIG. 1 is a schematic view showing a rechargeable lithium battery according to one embodiment.

Referring to FIG. 1, a rechargeable lithium battery 100 according to one embodiment includes an electrode assembly including a positive electrode 114, a negative electrode 112 facing the positive electrode 114, a separator 113 interposed between the negative electrode 112 and the positive electrode 114, a battery case 120 housing the electrode assembly, and a sealing member 140 sealing the battery case 120. The electrode assembly is impregnated in an electrolyte solution.

The negative electrode 112 includes a current collector and a negative active material layer disposed on the current collector.

The current collector may be a copper foil.

The negative active material layer includes a negative active material, a binder, and optionally a conductive material.

The negative active material is the same as described above.

The binder improves binding properties of negative active material particles with one another and with a current collector.

Among the above negative active materials, the lithium metal nitride is alkaline, and thus, the binder may be an organic binder.

In some embodiments, the organic binder may include polyvinylidene fluoride, polyimide, polyamideimide, polyamide, aramid, polyarylate, polyetheretherketone, polyetherimide, polyethersulfone, polysulfone, polyphenylenesulfide, polytetrafluoroethylene, or a combination thereof.

The conductive material improves conductivity of an electrode. Any electrically conductive material may be used as a conductive material, unless it causes a chemical change. In some embodiments, the conductive material may include a carbon-based material such as natural graphite, artificial graphite, carbon black, acetylene black, ketjen black, a carbon fiber, and the like; a metal-based material of metal powder or metal fiber including copper, nickel, aluminum, silver, and the like; a conductive polymer such as a polyphenylene derivative; or a mixture thereof.

The negative electrode may be manufactured by a method including mixing the negative active material, the conductive material and the organic binder in water to prepare a negative active material layer composition, and coating the negative active material layer composition on the current collector.

The positive electrode 114 includes a current collector and a positive active material layer formed on the current collector. The positive active material layer may include a positive active material, a binder, and optionally a conductive material.

In some embodiments, the current collector may be Al (aluminum), but is not limited thereto.

In some embodiments, the positive active material may include lithiated intercalation compounds that reversibly intercalate and deintercalate lithium ions.

Specifically, the positive active material may be a lithium-containing compound such as a lithium-containing oxide, a lithium-containing phosphate salt, lithium-containing silicate, or a combination thereof.

The lithium-containing oxide, the lithium-containing phosphate salt and the lithium-containing silicate may be oxide, phosphate salt and silicate including lithium and metal respectively.

Examples of the metal may be Co, Ni, Mn, Fe, Cu, V, Si, Al, Sn, Pb, Sn, Ti, Sr, Mg, Ca, and the like.

Specifically, the lithium-containing oxide may be lithium cobalt oxide, lithium nickel oxide, lithium manganese oxide, lithium nickel cobalt manganese oxide, lithium nickel cobalt aluminum oxide, and the like. Examples of the lithium-containing phosphate salt may be a lithium iron phosphate salt, a lithium manganese phosphate salt, a lithium iron molybdenum phosphate salt, and the like.

In some embodiments, the positive active material may include activated carbon in addition to the lithium-containing compound. When the activated carbon is used with the lithium-containing compound, high output characteristics may be realized by obtaining the same effect as a capacitor.

The activated carbon is a porous carbon material and has a large surface area and as a result, shows strong ion adsorption and therefore causes a fast chemical reaction.

In some embodiments, the activated carbon may be included in an amount of about 1 to about 40 wt %, specifically about 1 to about 15 wt %, and more specifically about 3 to about 5 wt % based on the total amount of the lithium-containing compound and the activated carbon. When the activated carbon is used within the range, high energy density and high output characteristics may be simultaneously realized.

The binder improves binding properties of positive active material particles with one another and with a current collector. In some embodiments, the binder may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves conductivity of an electrode. Any electrically conductive material may be used as a conductive material, unless it causes a chemical change. In some embodiments, the conductive material may be one or more of natural graphite, artificial graphite, carbon black, acetylene black, ketjen black, a carbon fiber, a metal powder, a metal fiber, and the like of copper, nickel, aluminum, silver, and the like, a conductive material such as a polyphenylene derivative and the like.

The positive electrode may be manufactured by a method including mixing an active material, a conductive material, and a binder in a solvent to prepare an active material composition, and coating the composition on a current collector.

The electrode manufacturing method is well known, and thus is not described in detail in the present specification. The solvent includes N-methylpyrrolidone and the like, but is not limited thereto.

The electrolyte solution includes a non-aqueous organic solvent and a lithium salt.

The non-aqueous organic solvent serves as a medium for transmitting ions taking part in the electrochemical reaction of a battery. In some embodiments, the non-aqueous organic solvent may include a carbonate-based, ester-based, ether-based, ketone-based, alcohol-based, or aprotic solvent.

In some embodiments, the carbonate-based solvent may include, for example dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC) and the like.

In some embodiments, when the linear carbonate compounds and cyclic carbonate compounds are mixed, an organic solvent having a high dielectric constant and a low viscosity may be provided. In some embodiments, the cyclic carbonate compound and the linear carbonate compound are mixed together in a volume ratio ranging from about 1:1 to about 1:9.

In some embodiments, the ester-based solvent may be, for example, methyl acetate, ethyl acetate, n-propyl acetate, dimethyl acetate, methyl propionate, ethyl propionate, γ-butyrolactone, decanolide, valerolactone, mevalonolactone, caprolactone, and the like. In some embodiments, the ether solvent may be, for example dibutyl ether, tetraglyme, diglyme, dimethoxyethane, 2-methyltetrahydrofuran, tetrahydrofuran, and the like, and the ketone-based solvent may be cyclohexanone, and the like. In some embodiments, the alcohol-based solvent may be ethanol, isopropyl alcohol, and the like.

The non-aqueous organic solvent may be used singularly or in a mixture, and when the organic solvent is used in a mixture, the mixture ratio may be controlled in accordance with a desirable battery performance.

The non-aqueous electrolyte may further include an overcharge inhibitor additive such as ethylene carbonate, pyrocarbonate, or the like.

The lithium salt is dissolved in an organic solvent, supplies lithium ions in a battery, basically operates the rechargeable lithium battery, and improves lithium ion transportation between positive and negative electrodes therein. Specific examples of the lithium salt may be $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, LiCl, LiI, $LiB(C_2O_4)_2$ (lithium bis(oxalato) borate; LiBOB), or a combination thereof.

In some embodiments, the lithium salt may be used in a concentration ranging from about 0.1 M to about 2.0 M. When the lithium salt is included at the above concentration range, an electrolyte may have excellent performance and lithium ion mobility due to optimal electrolyte conductivity and viscosity.

The separator 113 may include any materials commonly used in the conventional lithium battery as long as separating the negative electrode 112 from the positive electrode 114 and providing a transporting passage for lithium ion. In other words, the separator may have a low resistance to ion transportation and an excellent impregnation for an electrolyte. For example, it may be selected from glass fiber, polyester, polyethylene, polypropylene, polytetrafluoroethylene (PTFE), or a combination thereof. It may have a form of a non-woven fabric or a woven fabric. For example, a polyolefin-based polymer separator such as polyethylene, polypropylene or the like is mainly used for a lithium ion battery. In order to ensure the heat resistance or mechanical strength, a coated separator including a ceramic component or a polymer material may be used. Selectively, it may have a mono-layered or multi-layered structure.

Hereinafter, the embodiments are illustrated in more detail with reference to examples. However, these examples are exemplary, and the present disclosure is not limited thereto.

Furthermore, what is not described in this disclosure may be sufficiently understood by those who have knowledge in this field and will not be illustrated here.

Manufacture of Negative Electrode

EXAMPLE 1

Soft carbon is coated on a core consisting of a graphite component according to a chemical vapor deposition (CVD) method. The graphite component has an interlayer spacing of less than or equal to 0.34 nm that is a d002 value when measured with XRD (PANalytical Co. (Netherland), 2θ=10~90°, Scan speed (°/s): 0.067335).

The coated carbon has an interlayer spacing of greater than or equal to 0.34 nm that is a d002 value in the XRD measurement considering a temperature for a final treatment and shows a typical amorphous peak at XRD 2θ, 26.5°.

Then, mechanical energy is applied on the surface of the coated carbon through a mechanofusion (AMS-Lab., 1.2 L, 3.7 kW) made by Hosokawa Micron Co. (Japan) at 1000-3000 rpm for 5 minutes and then, heat-treated at 600° C.-1200° C. for 0.5-1 hour.

Accordingly, the composite carbon material repetitively goes through surface damage and crystal growth and thus has a surface-damaged carbon structure, which is a defect on the surface, which is distinguished from a simple soft carbon layer.

The resulting composite carbon material includes the soft carbon component with a defect (i.e., a surface-damaged carbon structure) in an amount of 3.4 wt % based on the entire weight of the composite carbon material and has D/D' of 1.6.

Subsequently, 93 wt % of the composite carbon material, 4% of carbon black, and 3 wt % of a SBR/CMC (Styrene-Butadiene Rubber/Carboxymethyl Cellulose) binder are mixed and then, coated on a copper substrate, manufacturing a negative electrode. Herein, the negative electrode is used to manufacture a 1.0 Ah-level battery, and an electrolyte solution is prepared by mixing ethylene carbonate (EC), diethyl carbonate (DEC), and dimethyl carbonate (DMC) (a volume ratio of EC/DEC/DMC=1:1:1) and dissolving $LiPF_6$ in a 1.2 M concentration.

EXAMPLE 2

A composite carbon material is prepared according to the same method as Example 1.

The resulting composite carbon material includes 5 wt % of a soft carbon component with a defect (i.e., a surface-damaged carbon structure) based on the entire weight of the composite carbon material and has D/D' of 2.2.

Subsequently, 93 wt % of the composite carbon material, 4% of carbon black, and 3 wt % of a SBR/CMC binder are mixed and coated on a copper substrate, manufacturing a negative electrode.

EXAMPLE 3

A composite carbon material is prepared according to the same method as Example 1.

The obtained composite carbon material includes 6 wt % of a defected soft carbon component (i.e., a surface-damaged carbon structure) based on the entire weight of the composite carbon material and D/D' of 2.8.

Subsequently, 93 wt % of the composite carbon material, 4 w % of carbon black, and 3 wt % of a SBR/CMC binder were mixed and then, coated on a copper substrate, manufacturing a negative electrode.

EXAMPLE 4

A composite carbon material is prepared according to the same method as Example 1.

The obtained composite carbon material includes 4.3 wt % of a defected soft carbon component (i.e., a surface-damaged carbon structure) based on the entire weight of the composite carbon material and D/D' of 4.2.

Subsequently, 93 wt % of the composite carbon material, 4 w % of carbon black, and 3 wt % of a SBR/CMC binder were mixed and then, coated on a copper substrate, manufacturing a negative electrode.

COMPARATIVE EXAMPLE 1

93 wt % of crystalline carbon, 4 w % of carbon black, and 3 wt % of a SBR/CMC binder were mixed and then, coated on a copper substrate, manufacturing a negative electrode. The crystalline carbon has an interlayer spacing of 0.335 nm that is a d002 value when measured with XRD. The crystalline carbon is a natural graphite-based active material having 0.9 m$^2$/g from GS Energy Co. (China) and has D/D' of 5.1.

Manufacture of Positive Electrode 80 wt % of $LiCoO_2$, 10 wt % of activated carbon having a specific surface area of 1500 m$^2$/g, 5 wt % of carbon black, and 5 wt % of a PVDF-based binder were used to prepare positive electrode slurry. The positive electrode slurry was coated on an aluminum foil, manufacturing a positive electrode.

Manufacture of Battery Cell

The positive electrode and each negative electrode according to Examples 1 to 4 and Comparative Example 1 were used, manufacturing each rechargeable battery cell.

Evaluation 1: Voltage Measurement (Electrochemical Impedance Analyzer, Bio-Logic SAS (France))

The battery cell is fully-charged up to 4.2 V through CC/CV and allowed to stand at a low temperature of −10° C. for 10 hours. Then, a current at a 100 C-rate is applied thereto and discharged for one second, and then, voltage of the cell was measured.

Evaluation 2: Battery Efficiency (1)

Each battery cell is full-charged up to 4.2 V and discharged down to 2 V by applying a current at a 50 C-rate thereto. Herein, battery efficiency is calculated by comparing with 1 C discharge capacity.

Evaluation 3: Battery Efficiency (2) and Lithium Precipitation

Each battery cell is discharged down to 2 V at 0.2 C and 100 times repetitively 30 C charged/1 C discharged and checked regarding residual capacity and then, decomposed to examine lithium precipitation with unaided visual inspection.

The results of Evaluations 1 to 3 are provided in the following Table 1.

TABLE 1

| | Voltage after −10° C., 1 second | 50 C discharge/ 1 C discharge | 30 C charge, 100 times | Lithium precipitation (examination with unaided visual inspection) |
|---|---|---|---|---|
| Example 1 | 2.48 | 83% | 94% | Not found |
| Example 2 | 2.48 | 82% | 91% | Not found |
| Example 3 | 2.48 | 78% | 84% | Not found |
| Example 4 | 2.39 | 77% | 79% | Not found |
| Comparative Example 1 | 2.14 | 71% | 69% | Found |

Referring to Table 1, since a carbon component in a negative active material has a Raman peak (Renishaw, RM1000-Invia, USA) with laser excitation energies of 514 nm (2.41 eV) D/D' in a range of 1 to 4.5, the battery cells according to Examples 1 to 4 have excellent charge and discharge characteristics.

As the ratio D/D' measures towards the lower end of the range, the carbon component shows surface crystallinity closer to graphite but is not graphite and thus large-size graphene forms fault like shapes. Herein, large amount of lithium ions may go in and out of the valley-shaped cracks along the fault like shapes. As the ratio D/D' is higher, the carbon component shows surface closer to amorphous carbon and the D/D' of perfect amorphous carbon is difficult to measure.

The amorphous carbon has plenty of atomic pores rather than a large amount of cracks, through which lithium ions are allowed to go in and out.

While this disclosure has been described in connection with what is presently considered to be practical exemplary embodiments, it is to be understood that the invention is not limited to the disclosed embodiments and is intended to cover various modifications and equivalent arrangements included within the spirit and scope of the appended claims. In the present disclosure, the terms "Example," and "Comparative Example" are used to identify a particular example or experimentation and should not be interpreted as admission of prior art.

What is claimed is:

1. A negative active material for a rechargeable lithium battery comprising a carbon component having a ratio ($I_{1360}/I_{1620}$) of a peak intensity ($I_{1360}$) at 1360 cm$^{-1}$ relative to a peak intensity ($I_{1620}$) at 1620 cm$^{-1}$ ranging from about 1 to about 4.5 measured by Raman spectroscopy, wherein the carbon component is a composite carbon material comprising:
  carbon core including crystalline carbon; and
  surface-damaged carbon having defects on the surface of the carbon core including crystalline carbon and including amorphous carbon,
  wherein the core carbon comprises natural graphite, artificial graphite, or a combination thereof.

2. The negative active material of claim 1, wherein the carbon component has a ratio ($I_{1360}/I_{1620}$) of a peak intensity ($I_{1360}$) at 1360 cm$^{-1}$ relative to a peak intensity ($I_{1620}$) at 1620 cm$^{-1}$ ranging from about 1.1 to about 4.4 in Raman spectroscopy.

3. The negative active material of claim 2, wherein the carbon component has a ratio ($I_{1360}/I_{1620}$) of a peak intensity ($I_{1360}$) at 1360 cm$^{-1}$ relative to a peak intensity ($I_{1620}$) at 1620 cm$^{-1}$ ranging from about 1.2 to about 4.3 in Raman spectroscopy.

4. The negative active material of claim 1, wherein the carbon component has a ratio ($I_{1620}/I_{1580}$) of a peak intensity ($I_{1620}$) at 1620 cm$^{-1}$ relative to a peak intensity ($I_{1580}$) at 1580 cm$^{-1}$ ranging from about 0.01 to about 0.5 in Raman spectroscopy.

5. The negative active material of claim 1, wherein a ratio ($I_{1620}/I_{1580}$) of a peak intensity ($I_{1620}$) at 1620 cm$^{-1}$ relative to a peak intensity ($I_{1580}$) at 1580 cm$^{-1}$ has a substantially predetermined value in Raman spectroscopy of the composite carbon material regardless of an amount of the surface-damaged carbon.

6. The negative active material of claim 1, wherein the core carbon has an average particle diameter (D50) of about 3 μm to about 50 μm.

7. The negative active material of claim 1, wherein the surface-damaged carbon is present in an amount of about 0.5 wt % to about 8.5 wt % based on the total weight of the composite carbon material.

8. The negative active material of claim 1, wherein the surface-damaged carbon includes soft carbon, hard carbon or a combination thereof.

9. The negative active material of claim 8, wherein the soft carbon is obtained from coal pitch, petroleum pitch, polyvinylchloride, mesophase pitch, tar, low molecular weight heavy oil, or a combination thereof, and the hard carbon is obtained from a polyvinyl alcohol resin, a furfuryl alcohol resin, triton, citric acid, stearic acid, sucrose, polyvinylidene fluoride, carboxylmethyl cellulose, hydroxypropyl cellulose, regenerated cellulose, polyvinylpyrrolidone, polyethylene, polypropylene, an ethylene-propylene-diene monomer (EPDM), polyacrylic acid, sodium polyacrylate, polyacrylonitrile, glucose, gelatin, a saccharide, a phenolic resin, a naphthalene resin, a polyamide resin, a furan resin, a polyimide resin, a cellulose resin, a styrene resin, an epoxy resin and vinyl chloride resin, or a combination thereof.

10. A negative electrode for a rechargeable lithium battery including the negative active material of claim 1.

11. The negative electrode for the rechargeable lithium battery of claim 10 wherein the negative active material comprises the carbon component having a ratio ($I_{1360}/I_{1620}$) of a peak intensity ($I_{1360}$) at 1360 cm$^{-1}$ relative to a peak intensity ($I_{1620}$) at 1620 cm$^{-1}$ ranging from about 1.1 to about 4.4 in Raman spectroscopy.

12. The negative electrode for the rechargeable lithium battery of claim 10 wherein the negative active material comprises the carbon component having a ratio ($I_{1360}/I_{1620}$) of a peak intensity ($I_{1360}$) at 1360 cm$^{-1}$ relative to a peak intensity ($I_{1620}$) at 1620 cm$^{-1}$ ranging from about 1.2 to about 4.3 in Raman spectroscopy.

13. The negative electrode for the rechargeable lithium battery of claim 10 wherein the negative active material comprises the carbon component having a ratio ($I_{1620}/I_{1580}$) of a peak intensity ($I_{1620}$) at 1620 cm$^{-1}$ relative to a peak intensity ($I_{1580}$) at 1580 cm$^{-1}$ ranging from about 0.01 to about 0.5 in Raman spectroscopy.

14. A rechargeable lithium battery comprising
the negative electrode of claim 10,
a positive electrode, and
an electrolyte solution.

* * * * *